MILES S. BURNS'
COTTON SEED PLANTER.
No. 108445 — Patented Oct. 18, 1870 — Plate I.
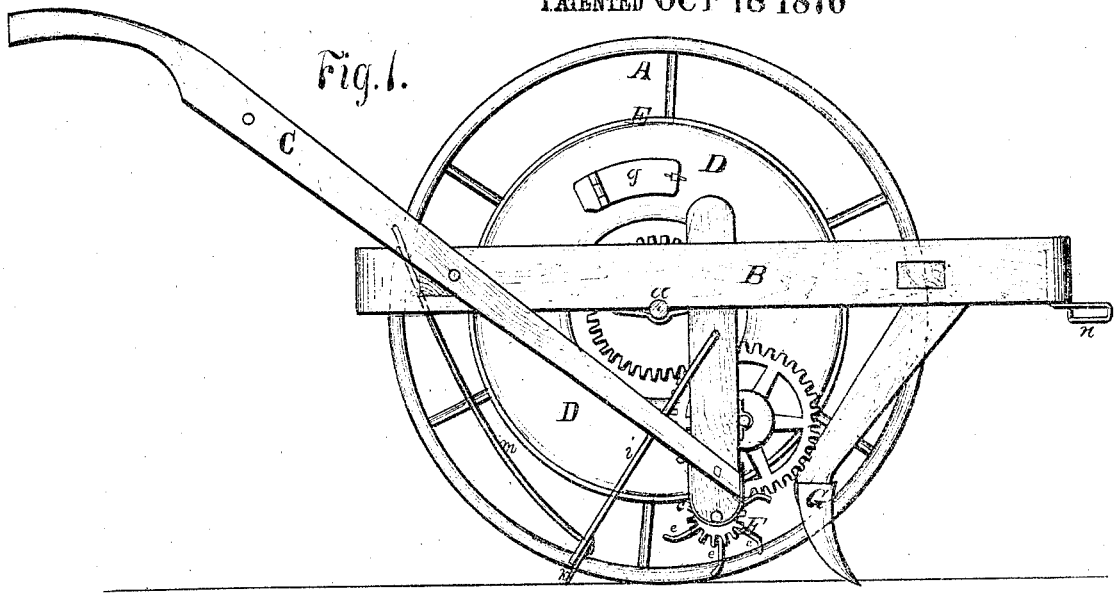
Fig. 1.
Attest.
Fig. 2.
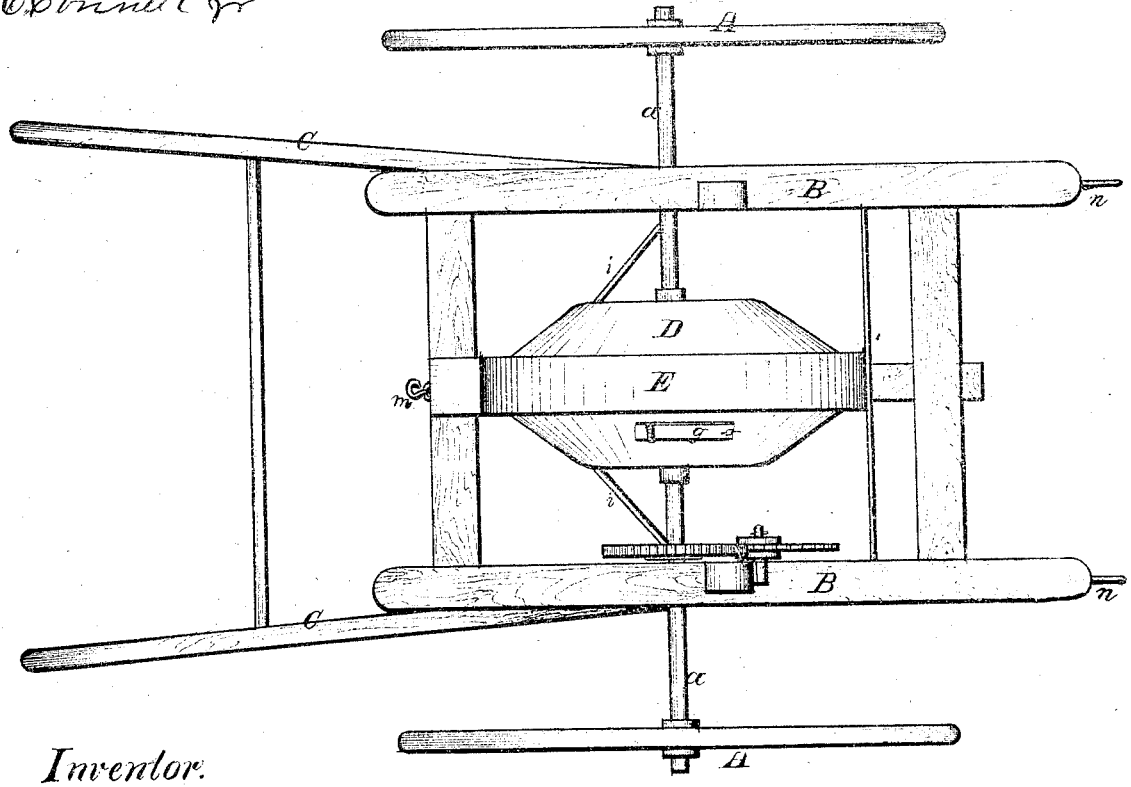
Inventor.
Miles S. Burns Miles S. Burns'
Cotton Seed Planter.

PLATE II.

Attest.
A.M. Cornett
H. Cornett Jr

Inventor.
Miles S. Burns

United States Patent Office.

MILES S. BURNS, OF MEMPHIS, TENNESSEE.

Letters Patent No. 108,445, dated October 18, 1870.

IMPROVEMENT IN COTTON-SEED PLANTERS.

The Schedule referred to in these Letters Patent and making part of the same.

*To all whom it may concern:*

Be it known that I, MILES S. BURNS, of Memphis, in the county of Shelby and State of Tennessee, have invented an Improved Cotton-seed Planter; and I do hereby declare the following to be a full and complete description of the same, reference being had to the accompanying drawing making part of this specification, Figure 1 being a side elevation.

Figure 2, a plan.

Figure 3:
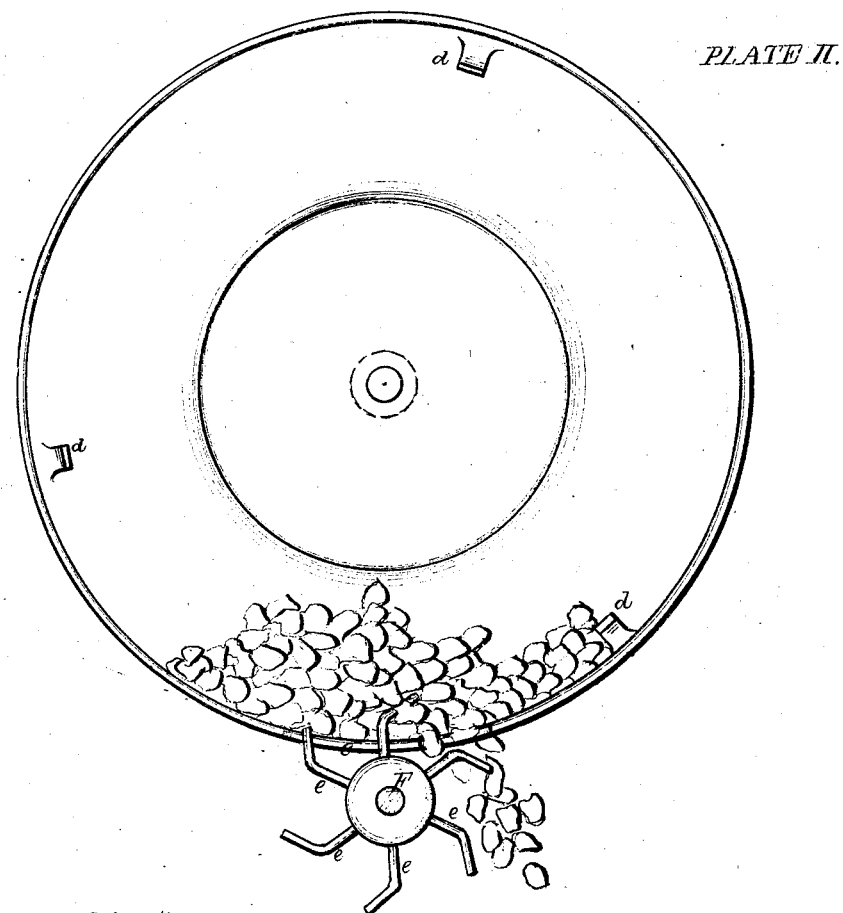

Figure 3, an enlarged interior view of the seed-holder.

Figure 4:
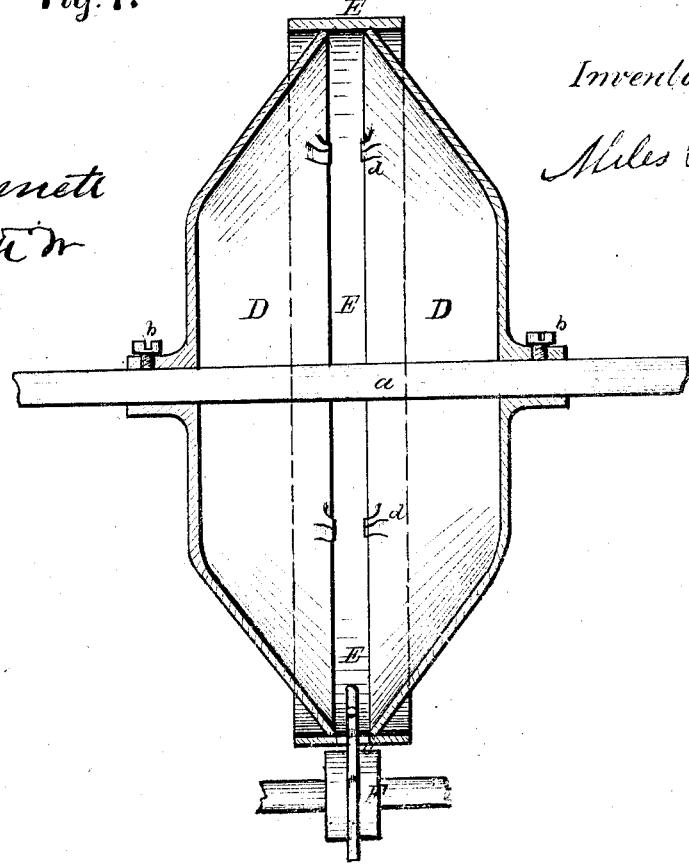

Figure 4, a section of the latter.

Like letters of reference designate corresponding parts in all the figures.

The principal feature of my invention consists in the employment of a peculiarly-constructed rotating seed-holder, operating in connection with a rotary distributer, to separate and distribute the seed in the rows evenly and in sufficient quantity.

In a planter where the seed-holder is stationary, it is well known that, from its peculiar nature, the seed will pack and stick together, and the distributer will cut its way through, forming an arch in the mass of seed after a few revolutions, and the teeth of the distributer will fail to reach the seed.

The principal object of my invention is to keep the adhering mass of seed constantly rolling about while the machine is in motion, and thus keep it in contact with the distributer, so that it may not fail to deliver the proper quantity of seed at the proper time.

Let A represent the ground or driving-wheels, secured rigidly to an axle, $a$;

B, the main frame; and

C C, the handles.

The seed-holder D is formed of two concave metallic disks, (see figs. 3 and 4,) secured to the axle $a$ by set-screws $b\ b$, or other equivalent device, so as to be adjustable, or the axle may be made in two parts, and the disks secured rigidly to the inner ends of the said parts.

The faces of these disks do not meet, but a space is left between them for the seed to pass through.

To prevent the seed from escaping at any but the desired point, a circular band, E, its inside diameter coinciding with the greatest diameter of the seed-holder, is secured to the main frame, and encircles the holder, as shown. This band is slotted on the under side at $c$, so as to admit the distributer, as shown in fig. 3.

Lugs $d\ d$, secured to the inner side of the holder, (see fig. 3,) and projecting therefrom, assist in keeping the seed stirred up.

The door for the admission of seed to the holder is shown at $g$.

The distributer F consists of a boss, furnished with a suitable number of bent rods $e\ e$, projecting radially therefrom in the manner shown.

This device is secured rigidly to a shaft bearing a pinion, which meshes with other suitable gearing, to obtain the proper rotary motion from the driving-shaft $a$.

The speed given the distributer regulates the amount of seed planted.

Draft-hooks $n\ n$ are shown, by which to attach the motive power, but a tongue may be substituted, if desired.

The machine, as shown, is arranged for the operator to walk and guide it with the handles, but a seat may be attached and the operator ride, if so desired.

Having thus described my invention,

I do not claim the devices for opening the furrow and covering the same; but

What I do claim, and desire to secure by Letters Patent of the United States, is—

The seed-holder D and encircling slotted band E, when constructed and arranged to operate substantially as shown, and used in connection with a rotary distributer, F, in the manner shown, and for the purposes set forth.

MILES S. BURNS.

Witnesses:
HENRY CONNETT, Jr.,
A. M. CONNETT.